(12) United States Patent
Iyer et al.

(10) Patent No.: US 11,798,144 B2
(45) Date of Patent: Oct. 24, 2023

(54) SYSTEMS AND METHODS FOR DYNAMIC CAMERA FILTERING

(71) Applicant: Dell Products L.P., Round Rock, TX (US)

(72) Inventors: Vivek Viswanathan Iyer, Austin, TX (US); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 111 days.

(21) Appl. No.: 17/087,912

(22) Filed: Nov. 3, 2020

(65) Prior Publication Data
US 2022/0138918 A1    May 5, 2022

(51) Int. Cl.
*G06T 5/00* (2006.01)
*G06T 5/20* (2006.01)
*H04N 5/262* (2006.01)
*H04N 23/741* (2023.01)

(52) U.S. Cl.
CPC ............... *G06T 5/20* (2013.01); *G06T 5/009* (2013.01); *H04N 5/2621* (2013.01); *H04N 23/741* (2023.01)

(58) Field of Classification Search
CPC ... G06T 19/006; G06T 2210/16; G06T 11/00; G06T 2207/10016; G06T 2207/30196; G06T 3/0012; G06T 7/251; G06V 20/52; G06V 40/10; G06V 40/161; G06V 40/172; G06V 10/28; G06V 10/44; G06V 10/467; G06V 20/40; G06V 40/28; G06Q 30/0643; G06Q 20/386; H04N 7/15; H04N 5/23219; H04N 5/23222; H04N 7/147; H04L 51/10; H04L 51/046; H04L 51/52

See application file for complete search history.

(56) References Cited

U.S. PATENT DOCUMENTS

| | | | |
|---|---|---|---|
| 9,992,450 B1 * | 6/2018 | Yuan | H04N 7/147 |
| 2017/0187776 A1 * | 6/2017 | Pell | H04N 7/15 |
| 2018/0152666 A1 * | 5/2018 | Taine | G06T 7/73 |
| 2018/0152667 A1 * | 5/2018 | Taine | G06V 40/171 |
| 2019/0019067 A1 * | 1/2019 | Dettori | G06V 40/20 |

OTHER PUBLICATIONS

Yang et al. (Eye Gaze Correction with Stereovision for Video-Teleconferencing) (Year: 2004).*

* cited by examiner

*Primary Examiner* — Quan M Hua
(74) *Attorney, Agent, or Firm* — Jackson Walker L.L.P

(57) ABSTRACT

An information handling system may include a plurality of sensors comprising a camera sensor for communicating camera data, a user presence and focus state manager configured to receive the camera data and generate an inference of user presence and focus based on the camera data, and a dynamic filtering service. The dynamic filtering service may be configured to receive the inference, determine based on the inference a filtering action, and cause the filtering action to be applied to dynamically-generated information associated with a user of the information handling system and communicated to other information handling systems communicatively coupled to the information handling system.

11 Claims, 3 Drawing Sheets

| USER PRESENCE | PRIOR STATE | HYSTERESIS | ATTENTION | HYSTERESIS | INFERENCE RESULT | ACTION |
|---|---|---|---|---|---|---|
| PRESENT | PRESENT | n/a | YES | n/a | ... | NO ACTION |
| PRESENT | NOT PRESENT | >5 SECONDS | YES | >5 SECONDS | | ENSURE AUDIO AND CAMERA ARE DEFAULT SETTING |
| PRESENT | NOT PRESENT | <5 SECONDS | n/a | n/a | | NO ACTION |
| PRESENT | NOT PRESENT | >5 SECONDS | NO | n/a | | NO ACTION |
| PRESENT | PRESENT | n/a | NO | <5 SECONDS | ... | NO ACTIONS |
| PRESENT | PRESENT | n/a | NO | >5 SECONDS | FULL DISENGAGED | REPLACE CAMERA STREAM |
| PRESENT | PRESENT | n/a | NO | >5 SECONDS | OFF-SCREEN DISTRACTION | ENHANCE IMAGE: JOWL/BALD SPOT ENHANCEMENTS |
| PRESENT | PRESENT | n/a | NO | >5 SECONDS | MULTIPLE USERS | DISABLE CAMERA STREAM AUDIO MUTE |
| PRESENT | PRESENT | n/a | NO | >5 SECONDS | ON SCREEN DISTRACTION | ENHANCE IMAGE: FOCUS EYES |
| PRESENT | PRESENT | n/a | NO | >5 SECONDS | ... | ...ADDITIONAL ACTIONS |
| NOT PRESENT | n/a | <5 SECONDS | n/a | n/a | | NO ACTIONS |
| NOT PRESENT | n/a | >5 SECONDS | n/a | n/a | | REPLACE WITH STATIC IMAGE |
| ... | | | | | | ... |

SYSTEMS AND METHODS FOR DYNAMIC CAMERA FILTERING

TECHNICAL FIELD

The present disclosure relates in general to information handling systems, and more particularly to systems and methods for real-time adaptive user attention sensing.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Due to the globalization of many industries, and a recent shift to a "work-from-home" posture in many industries due to pandemic, teams of individuals are increasingly collaborating via video conferencing platforms. When participating in a video conference, an individual may have concern over his/her appearance and how the individual is seen by other video conference participants. Further from a security point of view, it may be desirable to manipulate a video feed of a video conference participant when the participant is not present or within the frame of view, to avoid sensitive information proximate to the participant from being shared.

SUMMARY

In accordance with the teachings of the present disclosure, the disadvantages and problems associated with display of a video conference participant's feed may be reduced or eliminated.

In accordance with embodiments of the present disclosure, an information handling system may include a plurality of sensors comprising a camera sensor for communicating camera data, a user presence and focus state manager configured to receive the camera data and generate an inference of user presence and focus based on the camera data, and a dynamic filtering service. The dynamic filtering service may be configured to receive the inference, determine based on the inference a filtering action, and cause the filtering action to be applied to dynamically-generated information associated with a user of the information handling system and communicated to other information handling systems communicatively coupled to the information handling system.

In accordance with these and other embodiments of the present disclosure, a method may include, in an information handling system comprising a camera sensor for communicating camera data, generating an inference of user presence and focus based on the camera data, determining based on the inference a filtering action, and causing the filtering action to be applied to dynamically-generated information associated with a user of the information handling system and communicated to other information handling systems communicatively coupled to the information handling system.

In accordance with these and other embodiments of the present disclosure, an article of manufacture may include a non-transitory computer-readable medium and computer-executable instructions carried on the computer-readable medium, the instructions readable by a processing device, the instructions, when read and executed, for causing the processing device to, in an information handling system comprising a camera sensor for communicating camera data: generate an inference of user presence and focus based on the camera data, determine based on the inference a filtering action, and cause the filtering action to be applied to dynamically-generated information associated with a user of the information handling system and communicated to other information handling systems communicatively coupled to the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates an example table for implementing a dynamic filtering policy, in accordance with embodiments of the present disclosure.

DETAILED DESCRIPTION

Figure 1:
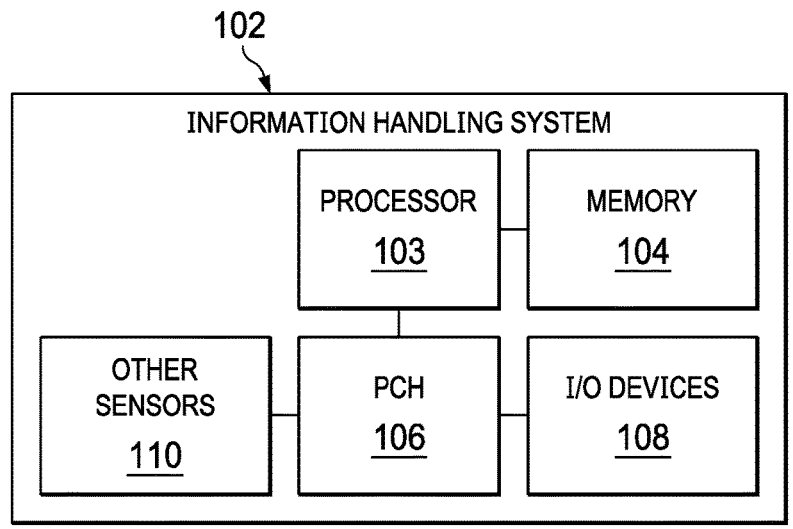
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

The terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), BLUETOOTH, ISO 14443, ISO 15693, or other suitable standard), IEEE 802.11ad (Wireless Gigabit or "WiGig"), personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red, and laser.

The term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, Ethernet cabling (10baseT, 100baseT, etc.), coaxial cables, T-1 lines, T-3 lines, ISDN lines, ADSL, etc.

FIG. 1 illustrates a block diagram of an example information handling system 102, in accordance with embodiments of the present disclosure. In some embodiments, information handling system 102 may be a personal computer. In particular embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a platform controller hub (PCH) 106 communicatively coupled to processor 103, input/output devices 108 communicatively coupled to processor 103 via PCH 106, and one or more other sensors 110 communicatively coupled to processor 103 via PCH 106.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may include any system, device, or apparatus configured to retain data (including program instructions) for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

PCH 106 may be any system, device, or apparatus configured to control certain data paths (e.g., data flow between processor 103, memory 104, and peripherals) and support certain functions of processor 103. A PCH 106 may also be known as a "chipset" of an information handling system 102. For example, one such function may include implementing a management engine. A management engine may comprise hardware and/or firmware that enables remote out-of-band management for information handling system 102 in order to monitor, maintain, update, upgrade, and/or repair information handling system 102.

Each of one or more input/output (I/O) devices 108 may comprise any system, device, or apparatus configured to generate output to a user or another component and/or configured to receive input from a user or another component. Examples of I/O devices 108 may include a display, a keyboard, a mouse, an interactive touch screen, a camera, and/or associated controllers.

Each of one or more other sensors 110 may include any system, device, or apparatus configured to sense one or more physical quantities, and generate one or more signals indicative of such one or more physical quantities. An example of a sensor 110 may include a temperature sensor, an ambient light sensor, a proximity sensor, a motion sensor, a camera, and any other suitable sensor.

In addition to processor 103, memory 104, PCH 106, I/O devices 108, and other sensors 110, information handling system 102 may include one or more other information handling resources.

Figure 2:
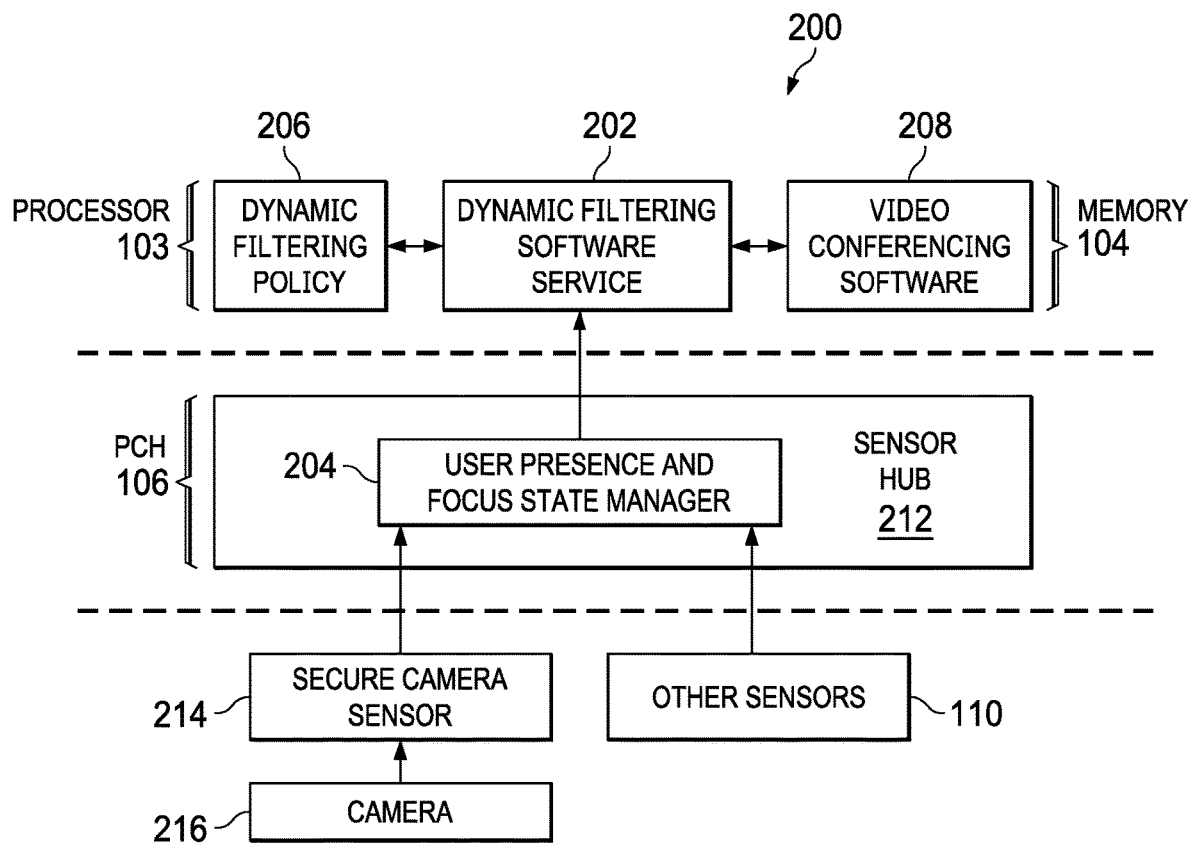
FIG. 2 illustrates an architecture for an example system for dynamic camera filtering, in accordance with embodiments of the present disclosure.

FIG. 2 illustrates an architecture for an example system 200 for dynamic camera filtering, in accordance with embodiments of the present disclosure. As shown in FIG. 2, processor 103 and memory 104 may implement a dynamic filtering software service 202 and video conferencing software 208 that executes on top of an operating system, and a dynamic filtering policy 206 that may be accessed by dynamic filtering software service 202, as described in more detail below.

Dynamic filtering software service 202 may comprise any suitable interface between an operating system and sensor hub 212, such that user presence and focus state information communicated from user presence and focus state manager 204 may be processed by dynamic filtering software service 202 in accordance with dynamic filtering policy 206 to perform dynamic camera filtering, as described in greater detail below.

Video conferencing software 208 may comprise any suitable program of instructions for facilitating a video conference among a participant local to information handling system 102 and one or more other participants local to other information handling systems communicatively coupled to information handling system 102 (e.g., via the Internet).

Dynamic filtering policy 206 may comprise any suitable database, table, map, list, or other data structure setting forth rules for dynamic filtering based on user presence and focus state information communicated from user presence and focus state manager 204. FIG. 3 illustrates an example table 300 for implementing dynamic filtering policy 206, in accordance with embodiments of the present disclosure. As shown in FIG. 3, example table 300 sets forth a number of examples of user presence information and user focus/attention information and an action that may be taken by dynamic filtering software service 202 in response to such user presence information and user focus/attention information. However, it is understood that example table 300 as shown in FIG. 3 may not be complete and comprehensive, and an actual implementation of dynamic filtering policy 206 may include fewer or more entries than shown in example table 300. Examples of user presence information and user focus/attention information may include presence duration, focus attention, whether a user is within a core field of view of a camera, etc. Examples of actions taken by dynamic filtering software service 202 may include, without limitation, replacement of the actual captured video stream of camera 216 with a different video stream or still image, image enhancements (e.g., digitally enhance jowls, bald spots, or blemishes of a participant; filter to provide appearance of eye focus by user when user has an on-screen distraction, etc.). Other examples of actions taken by dynamic filtering software service 202 may include actions other than modification of a video stream of a user, including modification of audio obtained from a user (e.g., muting user's microphone or playback of pre-recorded audio), and modification of text displayed in connection with the user (e.g., a user interface element in a chat window of the video conferencing platform indicating the user is "thinking").

As also shown in FIG. 2, PCH 106 may include or may otherwise implement a sensor hub 212. In some embodiments, sensor hub 212 may be an integral part of an Intel Integrated Sensor Hub. As described in greater detail below, sensor hub 212 may implement a user presence and focus state manager 204.

User presence and focus state manager 204 may be configured to receive the various conditioned sensor data (e.g., raw camera image, three-dimensional depth indicators, user gaze or other indicators of attentiveness, etc.) from a secure camera sensor 214 and other sensors 110 and based thereon, including any relevant policy information, identify which conditioned sensor information to use to make an inference of user awareness and focus/attention. In essence, user presence and focus state manager 204 may select data from another sensor 110 or fuse data from multiple other sensors 110 to make an inference or other determination of user awareness and/or focus.

Secure camera sensor 214 may comprise any suitable system, device, or apparatus to receive one or more signals from a camera 216, condition such one or more signals into camera sensor parameters indicative of user awareness, and communicate such camera sensor parameters, in a secure manner, to user presence and focus state manager 204. In some embodiments, secure camera sensor 214 may be implemented by an Intel CloverFalls microchip or similar companion microchip for control and/or sensing of camera data.

Figure 4:
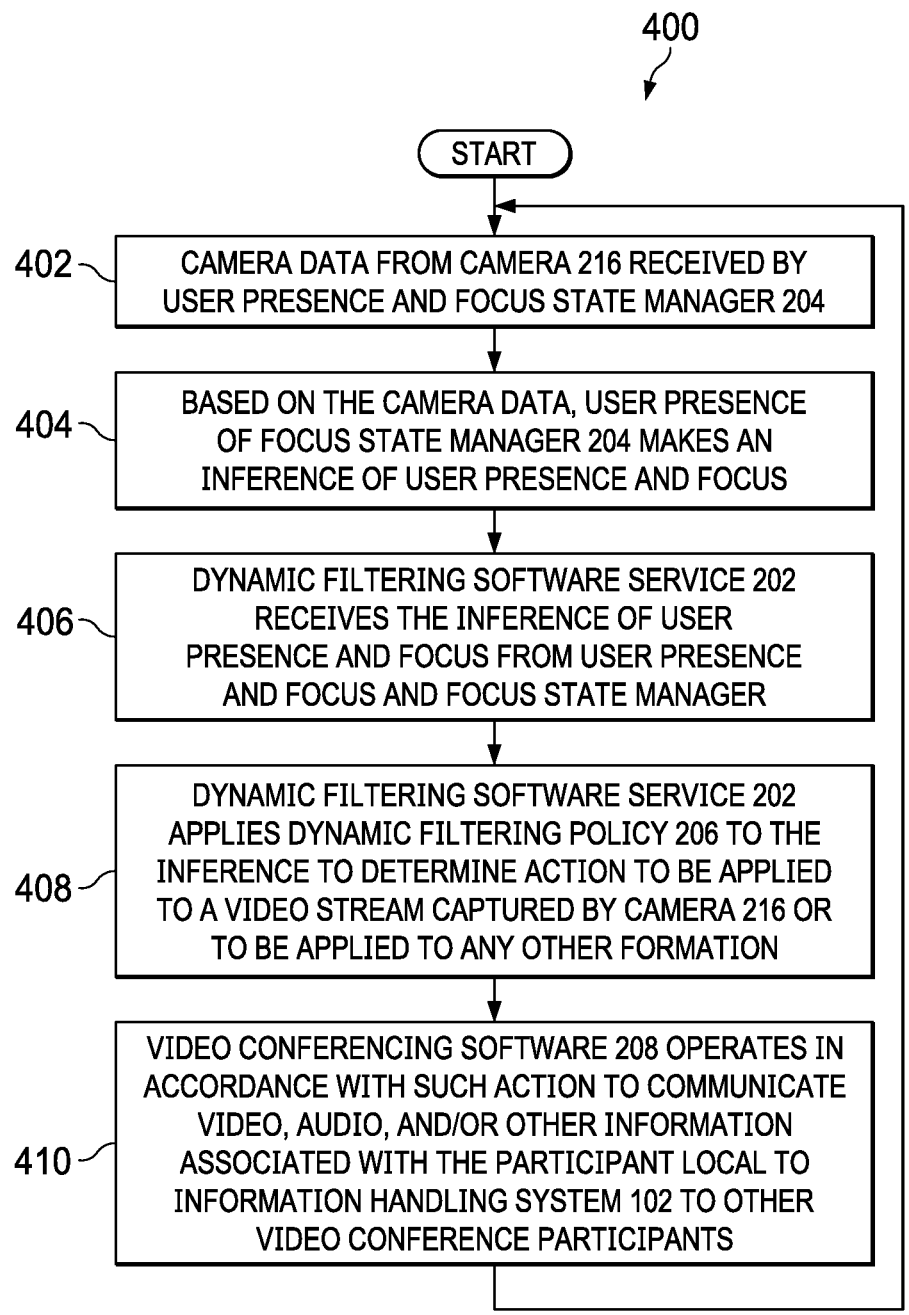
FIG. 4 illustrates a flow chart of an example method for dynamic camera filtering, in accordance with embodiments of the present disclosure.

FIG. 4 illustrates a flow chart of an example method 400 for dynamic camera filtering, in accordance with embodiments of the present disclosure. According to one embodiment, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, camera data from camera 216 may be received by user presence and focus state manager 204. At step 404, based on the camera data, user presence and focus state manager 204 may make an inference of user presence and focus.

At step 406, dynamic filtering software service 202 may receive the inference of user presence and focus from user presence and focus state manager 204. At step 408, dynamic filtering software service 202 may apply dynamic filtering policy 206 to the inference to determine an action, if any, to be applied to a video stream captured by camera 216 or to be applied to any other information (audio, textual, graphical). At step 410, video conferencing software 208 may operate in accordance with such action to communicate video, audio, and/or other information associated with the participant local to information handling system 102 to other video conference participants.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a processor;
a camera configured to generate a video stream of a user of the information handling system;
a memory, accessible to the processor, including processor executable instructions, wherein the processor executable instructions include video conferencing instructions to access the video stream, generate conference video, and communicate the conference video to other information handling systems;
a plurality of sensors including:
a camera sensor configured to receive one or more signals from the camera; and
one or more other sensors;
a sensor hub coupled to the processor and configured to:
receive at least one camera sensor signal from the camera sensor; and
generate an inference of user presence and focus based on the at least one camera sensor signal; and
a dynamic filtering service configured to:
receive the inference;
determine based on the inference whether to perform a filtering action to modify the video stream, wherein the filtering action is selected from a group of filtering actions including providing appearance of eye focus by user responsive to determining user has an on-screen distraction.

2. The information handling system of claim 1, wherein the group of filtering actions includes a filtering action to replace the video stream associated with the user with an alternative video stream.

3. The information handling system of claim 1, wherein the group of filtering actions includes a filtering action to replace the video stream associated with the user with a still image.

4. The information handling system of claim 1, wherein the wherein the group of filtering actions includes a filtering action to enhance physical characteristics associated with the user.

5. The information handling system of claim 1, wherein:
the dynamically-generated information comprises at least audio information and textual information associated with the user; and
the group of filtering actions include a filtering action to modify the at least audio information and textual information associated with the user.

6. A user presence method comprising:
receiving, by a sensor hub coupled to a processor of an information handling system, at least one camera sensor signal from a camera sensor configured to receive one or more signals from a camera of the information handling, wherein the camera is configured to generate a video stream of a user and wherein the information handling system is configured to perform video conferencing operations to access the video stream, generate conference video, and communicate the conference video to other information handling systems;
generating an inference of user presence and focus based on the at least one camera sensor signal; and
determining, based on the inference, whether to perform a filtering action to modify the video stream, wherein the filtering action is selected from a group of filtering actions including providing appearance of eye focus by the user responsive to determining user has an on-screen distraction.

7. The method of claim 6, wherein the information handling system includes a plurality of sensors including the camera sensor and one or more other sensors, wherein the sensor hub is configured to receive one or more signals from each of the plurality of sensors.

8. The method of claim 6, wherein the group of filtering actions include a filtering action to replace the video stream associated with the user with an alternative video stream.

9. The method of claim 6, wherein the group of filtering actions include a filtering action to replace the video stream associated with the user with an alternative video stream.

10. The method of claim 6, wherein the filtering action modifies the video stream associated with the user to enhance at least one physical characteristic associated with the user.

11. The method of claim 6, wherein:
the dynamically-generated information comprises at least audio information and textual information associated with the user; and
the filtering action modifies the at least audio information and textual information associated with the user.

\* \* \* \* \*